(12) United States Patent
Kanda

(10) Patent No.: US 10,607,602 B2
(45) Date of Patent: Mar. 31, 2020

(54) SPEECH RECOGNITION DEVICE AND COMPUTER PROGRAM

(71) Applicant: National Institute of Information and Communications Technology, Tokyo (JP)

(72) Inventor: Naoyuki Kanda, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 171 days.

(21) Appl. No.: 15/575,512

(22) PCT Filed: May 10, 2016

(86) PCT No.: PCT/JP2016/063818
§ 371 (c)(1),
(2) Date: Apr. 2, 2018

(87) PCT Pub. No.: WO2016/190077
PCT Pub. Date: Dec. 1, 2016

(65) Prior Publication Data
US 2018/0204566 A1     Jul. 19, 2018

(30) Foreign Application Priority Data
May 22, 2015 (JP) ................. 2015-104336

(51) Int. Cl.
*G10L 15/16* (2006.01)
*G10L 15/193* (2013.01)
(Continued)

(52) U.S. Cl.
CPC ............ *G10L 15/16* (2013.01); *G10L 15/142* (2013.01); *G10L 15/193* (2013.01); *G10L 15/22* (2013.01)

(58) Field of Classification Search
None
See application file for complete search history.

(56) References Cited

U.S. PATENT DOCUMENTS 8,442,821 B1    5/2013 Vanhoucke
2001/0041978 A1*  11/2001 Crespo .............. G10L 15/1815
                                                  704/257
(Continued)

FOREIGN PATENT DOCUMENTS

| JP | 2009-80309    | 4/2009  |
| JP | 2016-218309 A | 12/2016 |
| JP | 2017-016131 A | 1/2017  |

OTHER PUBLICATIONS

Naoyuki Kanda et al., "Maximum A Posteriori based Decoding for CTC Acoustic Models", in Proceedings of Interspeech 2016, Sep. 8-12, 2016, pp. 1868-1872.

(Continued)

*Primary Examiner* — Douglas Godbold
(74) *Attorney, Agent, or Firm* — Renner, Otto, Boisselle & Sklar, LLP

(57) ABSTRACT

An object is to provide a speech recognition device with improved recognition accuracy using characteristics of a neural network. A speech recognition device includes: an acoustic model 308 implemented by a RNN (recurrent neural network) for calculating, for each state sequence, the posterior probability of a state sequence in response to an observed sequence consisting of prescribed speech features obtained from a speech; a WFST 320 based on S-1HCLG calculating, for each word sequence, posterior probability of a word sequence in response to a state sequence; and a hypothesis selecting unit 322, performing speech recognition of the speech signal based on a score calculated for each hypothesis of a word sequence corresponding to the speech signal, using the posterior probabilities calculated by (Continued)

the acoustic model 308 and the WFST 320 for the input observed sequence.

5 Claims, 5 Drawing Sheets

(51) Int. Cl.
  G10L 15/14 (2006.01)
  G10L 15/22 (2006.01)

(56) References Cited

U.S. PATENT DOCUMENTS

| | | | | |
|---|---|---|---|---|
| 2012/0065976 | A1* | 3/2012 | Deng | G10L 15/14 704/256.1 |
| 2014/0358545 | A1* | 12/2014 | Robichaud | G10L 15/18 704/257 |
| 2015/0039301 | A1 | 2/2015 | Senior | |
| 2015/0112679 | A1* | 4/2015 | Zhang | G10L 15/187 704/243 |
| 2015/0269934 | A1* | 9/2015 | Biadsy | G10L 15/197 704/235 |
| 2016/0093294 | A1* | 3/2016 | Kapralova | G10L 15/063 704/232 |
| 2016/0140956 | A1* | 5/2016 | Yu | G10L 15/16 704/240 |
| 2017/0004824 | A1 | 1/2017 | Yoo | |
| 2018/0204566 | A1 | 7/2018 | Kanda | |

OTHER PUBLICATIONS

Y. Miao, M. Gowayyed, and F. Metze, "EESEN: End-to-end speech recognition using deep RNN models and WFST-based decoding," in Proc. ASRU, 2015, pp. 167-174.
Dzmitry Bandanau, Jan Chorowski, Dmitriy Serdyuk, Philemon Brakel and Yoshua Bengio, "End-to-end attention-based large vocabulary speech recognition", in Proc. ICASSP, 2016, pp. 4945-4949 (cited in Specification).
A. Graves, S. Fernandez, F. Gomez, and J. Schmidhuber, "Connectionist temporal classification: labelling unsegmented sequence data with recurrent neural networks," in Proc. ICML. ACM, 2006, pp. 369-376.
A. L. Maas, A. Y. Hannun, D. Jurafsky, and A. Y. Ng, "First-pass large vocabulary continuous speech recognition using bi-directional recurrent DNNs," arXiv preprint arXiv:1408.2873, 2014.
A. Hannun, C. Case, J. Casper, B. Catanzaro, G. Diamos, E. Eisen, R. Prenger, S. Satheesh, S. Sengupta, A. Coates et al., "Deepspeech: Scaling up end-to-end speech recognition," arXiv preprint arXiv:1412.5567, 2014.
H. Sak, A. Senior, K. Rao, and F. Beaufays, "Fast and accurate recurrent neural network acoustic models for speech recognition," in Proc. INTERSPEECH 2015, pp. 1468-1472.
H. Sak, A. Senior, K. Rao, O. Irsoy, A. Graves, F. Beaufays, and J. Schalkwyk, "Learning acoustic frame labeling for speech recognition with recurrent neural networks," in Proc. ICASSP, 2015, pp. 4280-4284.
A. Senior, H. Sak, F. de Chaumont Quitry, T. N. Sainath, and K. Rao, "Acoustic modelling with CD-CTC-SMBR LSTM RNNs," in Proc. ASRU, 2015, pp. 604-609.
A. L. Maas, Z. Xie, D. Jurafsky, and A. Y. Ng, "Lexicon-free conversational speech recognition with neural networks," in Proc. NAACL HLT, 2015.
H. Sak, et al., "Long short-term memory based recurrent neural network architectures for large vocabulary speech recognition", arXiv e-prints, 2014.
C. Weng, et al., "Recurrent deep neural networks for robust speech recognition", in Acoustics, Speech and Signal Processing (ICASSP), 2014 IEEE International Conference on. IEEE, 2014, pp. 5532-5536 (Discussed in Specification).
Saon, et al., "Unfolded recurrent neural networks for speech recognition", in Fifteenth Annual Conference of the International Speech Communication Association, 2014.
Sak, et al., "Sequence discriminative distributed training of long short-term memory recurrent neural networks",Interspeech 2014.
J.T. Geiger, et al., "Robust speech recognition using long short-term memory recurrent neural networks for hybrid acoustic modelling", in Proceedings of the Annual Conference of International Speech Communication Association (INTERSPEECH), 2014.
Tatsuya Kawahara, "Onsei Ninshiki no Hohoron ni Kansuru Kosatsu-Sedai Kotai ni Mukete-", IPSJSIG Notes, Jan. 24, 2014 (Jan. 24, 2014), vol. 2014-SLP-100, No. 3, pp. 1-5 (with partial translation).
George E. Dahl, et al., "Context-Dependent Pre-Trained Deep Neural Networks for Large-Vocabulary Speech Recognition", IEEE Transactions on Audio, Speech, and Language Processing, Jan. 2012, vol. 20, No. I, pp. 30-42.
A. Graves, et al., "Towards End-to-End Speech Recognition with Recurrent Neural Networks", Proc. ICML 2014, Jun. 21, 2014, pp. 1764-1772.
Yotaro Kubo, et al., "Integrating Deep Neural Networks into Structured Classification Approach based on Weighted Finite-State Transducers", Proc. INTERSPECCH 2012, Sep. 9, 2012, pp. 2594-2597.
Steve Renals, et al., "Connectionist Probability Estimators in HMM Speech Recognition, IEEE Transactions on Speech and Audio Processing", Jan. 1994, vol. 2, No. I, Part 2, pp. 161-174.
International Search report for corresponding International Application No. PCT/JP2016/063818 dated May 5, 2016.

* cited by examiner $$\begin{aligned}
\tilde{W} &= \arg\max_{W} P(W|X_{1:T}) \\
&= \arg\max_{W} \frac{P(X_{1:T}|W)P(W)}{P(X_{1:T})} \\
&\simeq \arg\max_{W} \frac{P(X_{1:T}|S_{1:T})P(S_{1:T}|W)P(W)}{P(X_{1:T})}
\end{aligned}$$

50

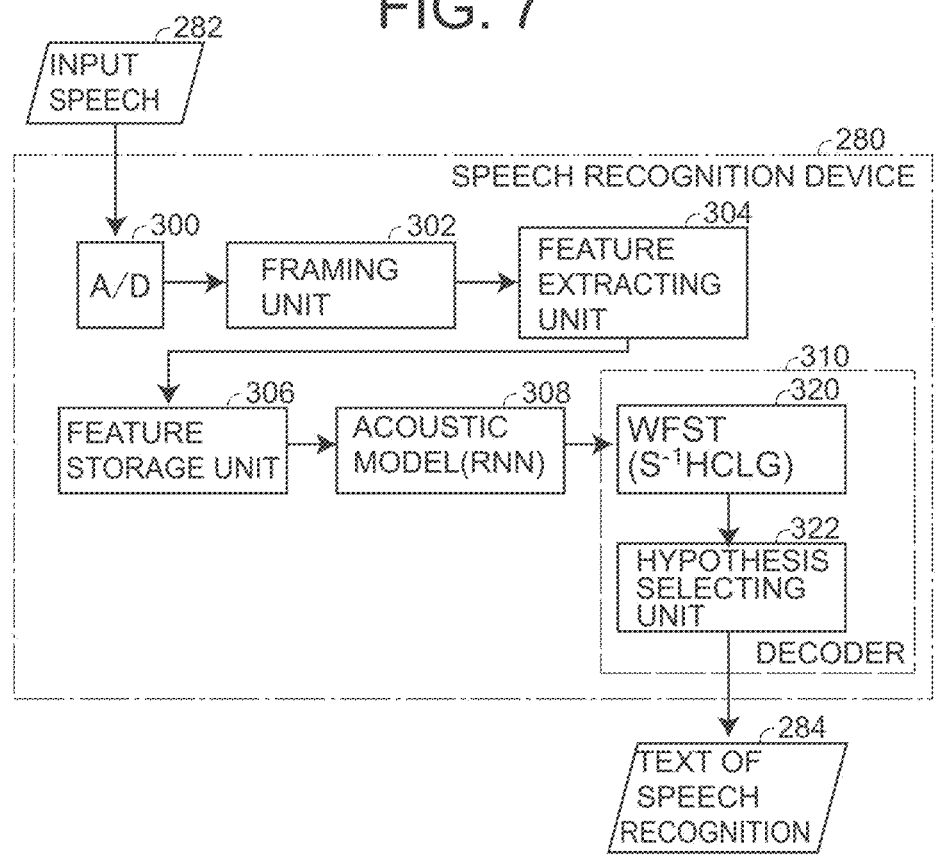

SPEECH RECOGNITION DEVICE AND COMPUTER PROGRAM

TECHNICAL FIELD

The present invention relates to a speech recognition device and, more specifically, to a speech recognition device performing highly accurate speech recognition using a neural network, as well as to a computer program thereof.

BACKGROUND ART

More and more devices and services are now using speech input/output as a man/computer interface. For instance, speech input/output is used for operating a portable telephone. As a basis of speech input/output, recognition accuracy of speech recognition devices must be as high as possible.

A common technique of speech recognition uses a model obtained by statistical machine learning. For example, HMM (Hidden Markov Model) is used as an acoustic model. Further, a word pronunciation dictionary for calculating the probabilities of character sequences generated in the process of speech recognition being obtained from the state sequences of HMM, and a language model for calculating the probabilities of appearances of word sequences of a certain language, are also used.

For performing such a process, a conventional speech recognition device includes: a framing unit for dividing the speech signals into frames; a feature generating unit for calculating features such as mel frequency cepstrum coefficients from each frame and forming a sequence of multi-dimensional feature vectors; and a decoder responsive to the sequence of feature vectors for outputting the word sequence having the highest likelihood of providing the sequence of feature vectors, utilizing the acoustic model and the language model. In calculating the likelihood, state transition probability and output probability from each state of HMM forming the acoustic model play important roles. These are both obtained through machine learning. The output probability is calculated by a pre-trained Gaussian mixture model.

Basic concept of speech recognition of a conventional speech recognition device will be described with reference to FIG. 1. Conventionally, it is assumed that a word sequence 30 (word sequence W) is influenced by various noises and observed as an observed sequence 36 (observed sequence X), and a word sequence that is expected to have the highest likelihood of generating the finally observed sequence X is output as a result of speech recognition. Let P(W) represent the probability of a word sequence W being generated. Further, let P(S|W) represent the probability of a state sequence S (state sequence 34) of HMM being generated from the word sequence W through a phoneme sequence 32 as an intermediate product. Further, let P(X|S) represent the probability of observed X being obtained from the state sequence S.

In the process of speech recognition, as shown by the first equation of FIG. 2, when an observed sequence $X_{1:T}$ from the start to a time point T is given, a word sequence that has the highest likelihood of generating such an observed sequence is output as a result of speech recognition. Specifically, the word sequence $\tilde{W}$ as the result of speech recognition is calculated by the equation below. The sign "~" appearing above a character in the equation is depicted immediately preceding the corresponding character in the texts of this Specification.

$$\tilde{W} = \arg\max_{W} P(W|X_{1:T}). \tag{1}$$

By modifying the right side of this equation in accordance with Bayes' theorem, we obtain $$\tilde{W} = \arg\max_{W} \frac{P(X_{1:T}|W)P(W)}{P(X_{1:T})}. \tag{2}$$

Further, the first term of the numerator can be calculated by HMM as $$P(X_{1:T}|W) \approx P(X_{1:T}|S_{1:T})P(S_{1:T}|W). \tag{3}$$

Here, the state sequence $S_{1:T}$ represents a state sequence $S_1, \ldots, S_T$ of HMM. The first term of the right side of Equation (3) represents output probability of HMM. From Equations (1) to (3), the word sequence $\tilde{W}$ as the result of speech recognition can be given by $$\tilde{W} = \arg\max_{W} \frac{P(X_{1:T}|S_{1:T})P(S_{1:T}|W)P(W)}{P(X_{1:T})}. \tag{4}$$

In HMM, an observed value $x_t$ at time point t depends only on the state $s_t$. Therefore, the output probability $P(X_{1:T}|S_{1:T})$ of HMM in Equation (4) can be calculated by the equation below.

$$P(X_{1:T}|S_{1:T}) = \prod_{t=1}^{T} P(X_t|S_t). \tag{5}$$

The probability $P(x_t|s_t)$ is calculated by Gaussian Mixture Model (GMM).

Among other terms of Equation (4), $P(S_{1:T}|W)$ is calculated by a product of state transition probability of HMM and pronunciation probability of a word, and P(W) is calculated by the language model. The denominator $P(X_{1:T})$ is common to each hypothesis and, therefore, it is negligible when arg max operation is executed.

Recently, a framework called DNN-HMM hybrid has been studied wherein output probability of HMM is calculated by a Deep Neural Network (DNN) in place of GMM. The hybrid method using DNN-HMM is attracting attention as it attains higher accuracy than an acoustic model using GMM. Here, originally, a DNN output represents posterior probability $P(S_t|X_t)$ and, therefore, it does not fit into the conventional framework using HMM that employs output probability $(X_t|S_t)$. As a solution to this problem, Bayes' theorem is applied to the posterior probability $P(S_t|X_t)$ output from DNN to modify it into a form the output probability $(X_t|S_t)$.

CITATION LIST

Non Patent Literature

NPL 1: C. Weng, D. Yu, S. Watanabe, and B.-H. F. Juang, "Recurrent deep neural networks for robust speech recognition," in Acoustics, Speech and Signal Processing (ICASSP), 2014 IEEE International Conference on. IEEE, 2014, pp. 5532-5536.

SUMMARY OF INVENTION

Technical Problem

Recently, as a neural network to be applied to an acoustic model, a Recurrent Neural Network (RNN) is getting much attention. A RNN is structured such architecture it includes not only one-way connections between nodes from an input layer to an output layer but also connections between nodes from an output side layer to an adjacent input side layer, connections between layers in the same layer, and/or self-loop connections. Because of this architecture, a RNN is capable of representing time-dependent information, which is a characteristic not found in ordinary neural networks. Speech is a typical example of time-dependent information. Therefore, a RNN is considered to be suitable for an acoustic model.

According to conventional studies, however, speech recognition devices using a RNN do not have very high performance. Non-Patent Literature 1 reports accuracy improvement of 4 to 7% from the conventional approach by a sigmoid activation function using a RNN trained by an improved error back propagation learning method. The improved performance of the RNN disclosed in Non-Patent Literature 1, however, is derived from a comparison with a DNN of a smaller scale. Results with a DNN of comparable scale are not known. On the other hand, if a similar approach can effectively improve the accuracy of a DNN as well as the RNN, it would be desirable.

Therefore, an object of the present invention is to provide a speech recognition device capable of improving speech recognition accuracy by making use of neural network characteristics.

Solution to Problem

According to a first aspect, the present invention provides a speech recognition device, including: first posterior probability calculating means for calculating, for each state sequence, posterior probability of a state sequence in response to an observed sequence consisting of prescribed speech features obtained from a speech signal; second posterior probability calculating means for calculating, for each word sequence, posterior probability of a word sequence in response to a state sequence and means for performing speech recognition of the speech signal based on a score calculated for each hypothesis of a word sequence corresponding to the speech signal, using the posterior probabilities calculated by the first and the second posterior probability calculating means, for the input observed sequence.

The second posterior probability calculating means may include means for calculating posterior probability for each hypothesis of a word sequence corresponding to the speech signal, based on a probability of occurrence of a word sequence by a language model, a state transition probability of HMM forming an acoustic model, and a probability of occurrence of the state sequence calculated by the first posterior probability calculating means.

Preferably, each state of the state sequence is a state of HMM forming the acoustic model.

More preferably, the first posterior probability calculating means includes: a neural network responsive to an input of the observed sequence and pre-trained to calculate posterior probabilities of states that generate the observed sequence; and first probability calculating means for calculating probability of occurrence of the state sequence, based on the sequence of posterior probabilities calculated by the neural network.

Further preferably, the neural network is a RNN or a DNN.

According to a second aspect, the present invention provides a computer program causing a computer to function as all the means of any of the speech recognition devices described above.

BRIEF DESCRIPTION OF DRAWINGS

FIG. 6 shows equations underlying the speech recognition in accordance with the first embodiment of the present invention.

FIG. 7 is a block diagram showing a configuration of a speech recognition device in accordance with the first embodiment of the present invention.

DESCRIPTION OF EMBODIMENTS

Figure 1:
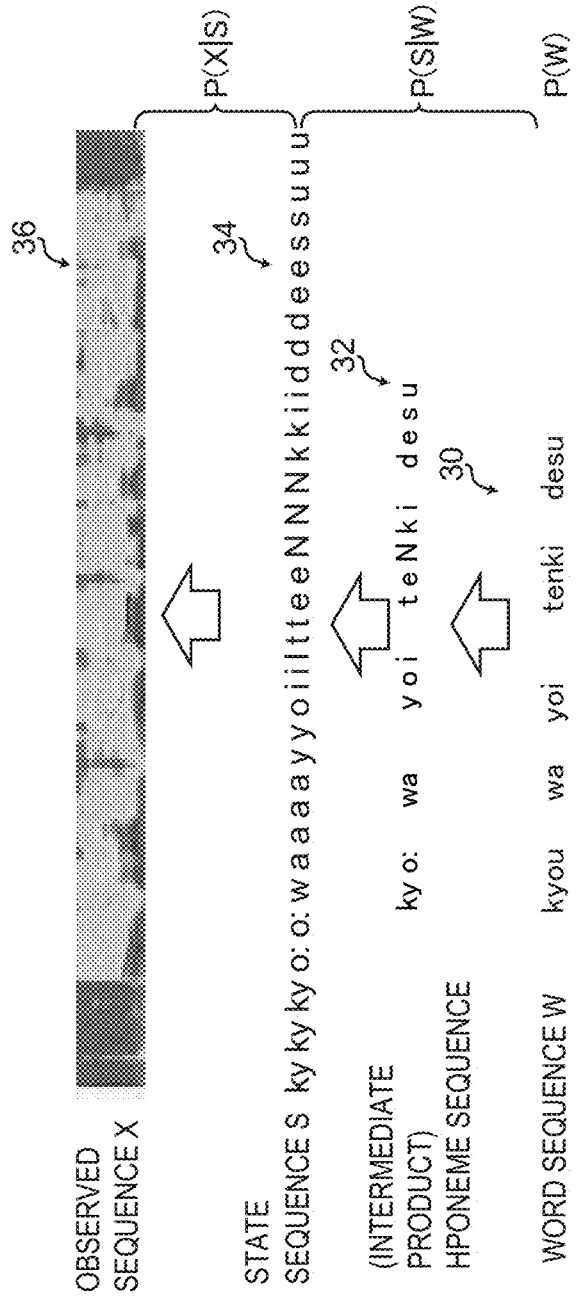
FIG. 1 shows a concept of conventional speech recognition.

In the following description and in the drawings, the same components are denoted by the same reference characters. Therefore, detailed description thereof will not be repeated.

Figures 2, 3:
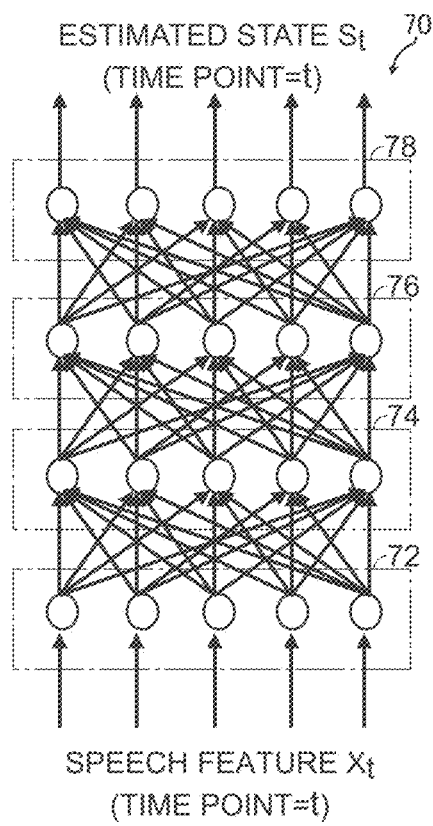
FIG. 2 shows equations underlying the conventional speech recognition.
FIG. 3 schematically shows architecture of a common DNN.

First, differences between a DNN and a RNN will be described. Referring to FIG. 3, a DNN 70 includes an input layer 72, an output layer 78, and a plurality of hidden layers 74 and 76 provided between input layer 72 and output layer 78. Though only two hidden layers are shown in this example, the number of the hidden layers is not limited to two. Each layer has a plurality of nodes. In FIG. 3, the number of nodes in each layer is the same, five. Generally, however, the number differs layer by layer. Adjacent nodes are connected to each other. It is noted, however, that data flows only in one direction, from the input side to the output side. Weight and bias are allocated to each connection. These weights and biases are learned by error back propagation using training data.

In DNN 70, when a speech feature $X_t$ at time point t is given to input layer 72 at time point t, an estimated state $S_t$ is output from output layer 78. An acoustic model is often designed such that the number of nodes of the output layer 78 is the same as the number of phonemes assumed for the language to be handled. In that case, each node represents probability of an input speech feature being the phoneme represented by that node. Therefore, the sum of estimated states of respective nodes of output layer 78 becomes 1.

Figure 4:
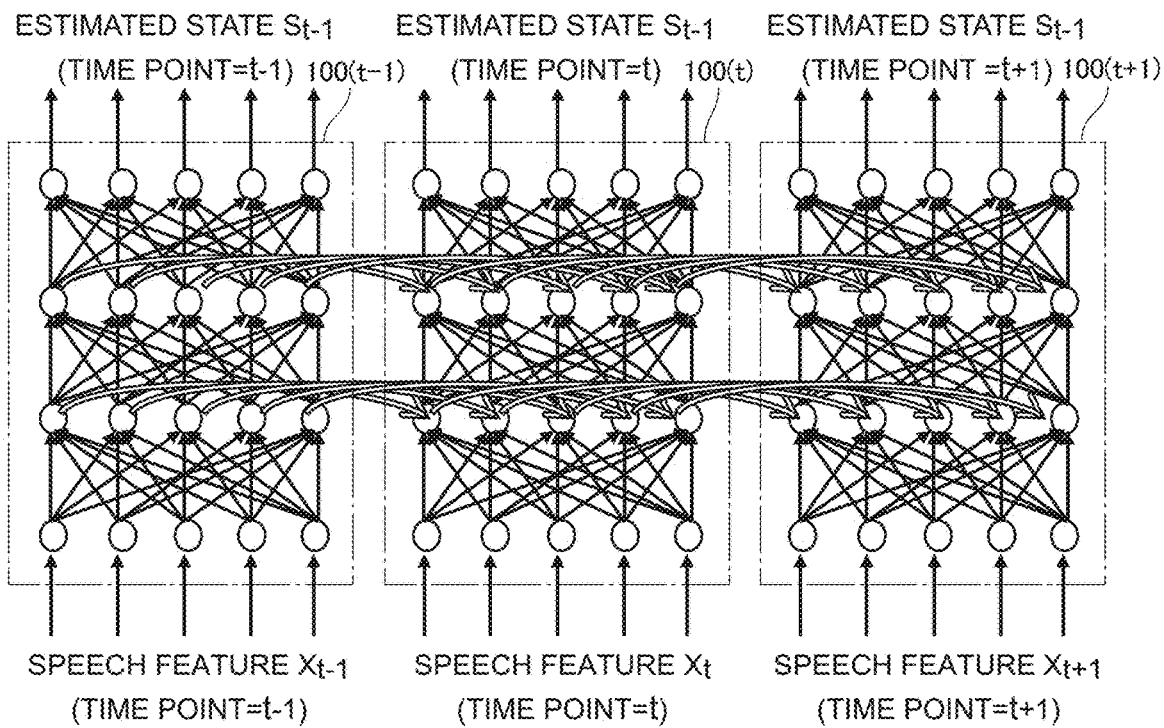
FIG. 4 schematically shows an example of architecture of a RNN and connections between nodes of RNN at different time points.

By contrast, FIG. 4 shows an example of RNN architecture. FIG. 4 shows a relation among RNN 100($t-1$) at time point t−1, RNN 100($t$) at time point t, and RNN 100($t+1$) at time point t+1. In this example, each of the nodes of the hidden layer of RNN 100(*t*) receives not only the output from each node of the input layer but also the output from itself, that is, from RNN 100(*t*−1). In other words, RNN 100 is capable of generating an output for a time sequence of input acoustic features.

What can be calculated from a DNN is $P(S_t|X_t)$. Specifically, it is the probability of HMM state $S_t$ when a feature $X_t$ is observed at time t. The state $S_t$ of HMM corresponds to a phoneme. On the other hand, what can be calculated from a RNN is $P(S_t|X_1, \ldots, X_t)$. Specifically, it is the probability of HMM state $S_t$ when an observed sequence $X_{1:t}$ is observed.

When compared with Equation (5), it can be seen that the output from a DNN cannot be applied directly to Equation (5). Therefore, conventionally, the DNN output is converted to $P(X_t|S_t)$ using Bayes' theorem, as shown below.

$$P(x_t|s_t) = \frac{P(s_t|x_t)P(x_t)}{P(s_t)} \quad (6)$$
$$\propto \frac{P(s_t|x_t)}{P(s_t)}.$$

In Equation (6), $P(x_t)$ is common to each HMM state and, therefore, it is negligible in arg max operation. $P(s_t)$ can be estimated by counting the number of each state in aligned training data.

After all, in the DNN-HMM hybrid method, the output $P(S_t|X_t)$ of DNN is divided by the probability $P(S_t)$, thereby calculating the recognition score using a DNN in a conventional framework using HMM.

On the other hand, when a RNN is used in place of a DNN, it becomes possible to make use of time-sequential information of speech for speech recognition and, therefore, improvement in accuracy is expected. All but a few attempts to simply replace a DNN by a RNN in the conventional DNN-HMM hybrid method, however, only resulted in lower accuracy than the DNN. Though there is a report such as Non-Patent Literature 1 that the accuracy was improved over a DNN, such improvement was obtained through a comparison with a DNN having smaller scale than the RNN. Therefore, we cannot conclude that the use of the RNN realized higher accuracy. A possible reason why higher accuracy cannot be attained by a RNN may be as follows.

The output from a RNN when an observed sequence $X_{1:t}$ is given will be posterior probability $P(S_t|X_{1:t})$ related to the state. When this output is divided by the probability $P(S_t)$ as in the case of a DNN-HMM hybrid method, what is obtained is $P(X_{1:t}|S_t)$, as represented by Equation (7) below, rather than the originally required $P(X_t|S_t)$ (shown by the left side of equation (6)).

$$\frac{P(S_t|X_{1:t})}{P(S_t)} = \frac{P(X_{1:t}|S_t)}{P(X_{1:t})} \propto P(X_{1:t}|S_t) \quad (7)$$

Since $P(X_{1:t}|S_t)$ is not proportional to $P(X_t|S_t)$, it is not possible to use it in Equation (5). It is because the state $S_t$ at time point t and preceding observed sequence $X_{1:t}$ have strong dependency. Though this score itself has abundant information, it is impossible to process it in the HMM framework.

Because of such reasons, accuracy decreases when a score is to be calculated by a RNN using the same framework as the DNN-HMM hybrid method.

Figure 5:
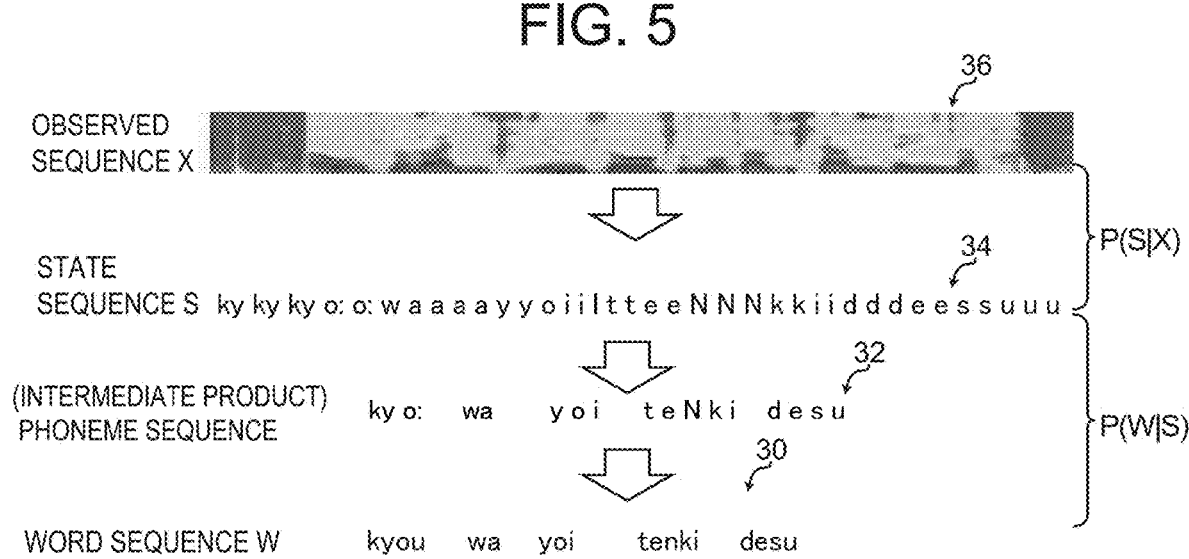
FIG. 5 shows a concept of speech recognition in accordance with a first embodiment of the present invention.

In view of the foregoing, it is necessary to use a framework other than the DNN-HMM hybrid method to realize highly accurate speech recognition while making use of the RNN characteristics. FIG. 5 proposes such a new framework. The present embodiment is directed to a device performing speech recognition in accordance with this framework. As already described, the output from RNN is posterior probability $P(S_t|X_{1:t})$. The present embodiment adopts a concept for speech recognition utilizing such a characteristic of RNN.

Referring to FIG. 5, in the present embodiment, probability of state sequence 34 is calculated from observed sequence 36 (observed sequence X), then probability of word sequence W30 is calculated from each state sequence 34 through phoneme sequence 32, and finally, a word sequence W30 having the highest probability is output as a result of speech recognition. The probability that a state sequence $S_{1:T}$ is obtained from observed sequence 36 (observed sequence $X_{1:T}$) is $P(S_{1:T}|X_{1:T})$, and the probability that a word sequence W is obtained from state sequence $S_{1:T}$ is $P(W|S_{1:T})$. Specifically, the word sequence $\tilde{W}$ of the result of speech recognition for the observed sequence $X_{1:T}$ is obtained in accordance with the following equation, which is also shown in FIG. 6.

$$\tilde{W} = \arg\max_W P(W|X_{1:T})$$
$$= \arg\max_W P(W|S_{1:T})P(S_{1:T}|X_{1:T})$$

The former half of this equation means that speech recognition is done by finding a word sequence $\tilde{W}$ of which probability becomes the highest when the feature $X_{1:T}$ is observed. The latter half of the equation means that the probability $P(W|X_{1:T})$ of a word sequence W is obtained as a product of the probability $P(S_{1:T}|X_{1:T})$ of the state sequence $S_{1:T}$ being generated from feature X and the probability $P(W|S_{1:T})$ of the word sequence W being generated from state sequence $S_{1:T}$.

In the equation, the term $P(W|S_{1:T})$, denoted by reference character 122 on FIG. 6, can be calculated by Equation (8) below.

$$P(W|S_{1:T}) = \frac{P(S_{1:T}|W)P(W)}{P(S_{1:T})}. \quad (8)$$

In Equation (8), the numerator also appears in Equation (4) of the conventional method, and it can be calculated in the conventional manner. The denominator is a language probability of state sequence $S_{1:T}$, which can be approximated by Equation (9) below. Using this equation, $P(S_{1:T})$ can be calculated using an N-gram language model.

$$P(S_{1:T}) = \prod_{t=1}^{T} P(S_t|S_{1:(t-1)}) \quad (9)$$
$$\cong \prod_{t=1}^{T} P(S_t|S_{(t-N+1):t-1}).$$

On the other hand, the term $P(S_{1:T}|X_{1:T})$, which is a term denoted by reference character 120 in FIG. 6, can be approximated in the following manner.

$$P(S_{1:T}|X_{1:T}) = \prod_{t=1}^{T} P(S_t|S_{1:t-1}, X_{1:T}) \quad (10)$$

$$\cong \prod_{t=1}^{T} P(S_t|S_{1:t-1}, X_{1:t}).$$

The former half of the upper part holds strictly in accordance with Bayes' theorem, and the approximation of the latter half assumes that the state $S_t$ does not depend on a future observed sequence $X_{(t+1):T}$. Such an approximation is generally impossible. Supposing that the observed value $X_t$ sufficiently reflects future observed sequence, however, this approximation becomes possible. For this purpose, at the time of learning of this probability, a large feature vector obtained by concatenating successive feature vectors including a vector or vectors of time points subsequent to a time point of interest (for example, a vector of a time point as an object and preceding and succeeding vectors) is used, or a label appended to an observed sequence is shifted behind. In the present embodiment, a vector as a concatenation of a vector at the time point as an object and preceding and succeeding vectors is used and further, the label is shifted behind.

The last equation can further be approximated as follows.

$$\prod_{t=1}^{T} P(S_t|S_{1:t-1}, X_{1:t}) \cong \prod_{t=1}^{T} P(S_t|X_{1:t}). \quad (11)$$

In this modification, it is assumed that posterior probability $P(S_t|S_{1:t-1}, X_{1:t})$ can sufficiently be approximated by the probability $P(S_t|X_{1:t})$ output by a RNN. This is not necessarily a presumption that $S_t$ and $S_{1:t-1}$ are independent from each other. Even when these two have strong dependency, this approximation is possible provided that the RNN has sufficiently high capabilities to calculate the state $S_t$ from observed sequence $X_{1:t}$. In theory, this is a very rough approximation. In a simulation, however, this method was found to be able to improve speech recognition accuracy, as will be described later.

Collectively considering the equation on FIG. 6 and Equations (8) to (10), we can conclude that in the conventional method, the recognition score is calculated as shown by equation (6) by dividing, at each time point, the output from DNN at each time point t by the probability $P(S_t)$, while in the method of the present embodiment, recognition score of a hypothesis is calculated by dividing (a product of) the RNN output for the hypothesis by the probability $P(S_{1:t})$, as represented by Equation (12) below.

$$\hat{W} = \arg\max_{W} P(S_{1:T}|W)P(W) \frac{\prod_{t=1}^{T} P(S_t|X_{1:t})}{P(S_{1:T})}. \quad (12)$$

In other words, the recognition score of each hypothesis is calculated using the value obtained by dividing the RNN output by $P(S_{1:T})$. In Equation (12), the RNN output is obtained at each time point, while all other values can be calculated based on previous learning. In this calculation, the RNN output is directly used, and it is unnecessary to forcefully convert a DNN output to the output format of HMM as in the conventional DNN-HMM hybrid method. Such a method is referred to as direct decoding method here.

In place of the approximation represented by Equation (9), other approximation may be used. For instance, a rough approximation as represented below may be used.

$$P(S_{1:T}) \cong \prod_{t=1}^{T} P(St)^{0.5} P(S_t|S_{t-1})^{0.5}. \quad (13)$$

Alternatively, the following approximation is also possible.

$$P(S_{1:T}) \cong \prod_{t=1}^{T} P(St)*0.5 + \prod_{t=1}^{T} P(S_t|S_{t-1})*0.5. \quad (14)$$

Various other methods of approximation may be possible.

The speech recognition device in accordance with the present embodiment uses a RNN as an acoustic model, and adopts the direct decoding method using its output.

Referring to FIG. 7, a speech recognition device 280 in accordance with the present embodiment has a function of performing speech recognition of an input speech 282 and outputting a text 284 of speech recognition. Speech recognition device 280 includes: an A/D converter circuit 300 performing analog/digital (A/D) conversion of input speech 282 and outputting the result as a digital signal; a framing unit 302 for dividing the digitized speech signal output from A/D converter circuit 300 into frames with a prescribed length and prescribed shift length allowing partial overlapping; and a feature extracting unit 304 performing a prescribed acoustic process on each of the frames output by framing unit 302, thereby extracting speech features of each frame and outputting a feature vector. Each frame and each feature vector have information such as relative time, for example, with respect to the head of input speech 282. The features used may include MFCCs (Mel-Frequency Cepstrum Coefficients), its first order differential, second order differential, power and so forth.

Speech recognition device 280 further includes: a feature storage unit 306 for temporarily storing the feature vectors output by feature extracting unit 304; an acoustic model 308 implemented by a RNN, receiving as an input a feature vector stored in feature storage unit 306 and for outputting a vector representing for each phoneme posterior probabilities of each frame at each time point corresponding to the phonemes; and a decoder 310 implemented by WFST (Weighted Finite-State Transducer), referred to as $S^{-1}HCLG$ in the present specification as will be described later, for outputting, using the vectors output from acoustic model 308, a word sequence having the highest probability as a text 284 of speech recognition corresponding to the input speech 282, by means of WFST. Use of an acoustic model 308 implemented by a RNN and use of a WFST configured in advance in accordance with the direct decoding method as a speech recognition decoder are the differences over the conventional examples.

Speech recognition decoder 310 includes: a WFST 320 based on $S^{-1}HCLG$ calculating probabilities of occurrences of a plurality of hypotheses (word sequences) using posterior probabilities of state sequences calculated by the acoustic model and outputting the result as a recognition score; and a hypothesis selecting unit 322 outputting, based on the recognition scores calculated by WFST 320, a hypothesis having the highest probability as the text 284 of speech recognition.

Speech recognition by WFST is as follows. As a model of state transition machine, finite automaton has been known. Finite automaton is a basic concept of computational theory, and one type thereof makes a state transition in accordance with predetermined rules in response to an input symbol sequence, and determines, based on the result of state transition, whether or not the input symbol sequence is to be accepted. WFST is derived from this type of automaton, and it is a transducer that makes a state transition upon reception of a certain symbol sequence and, at the same time, outputs a different symbol sequence. WFST can be represented as a graph including nodes and arcs connecting nodes. A node represents a state, and an arc represents a state transition. Each arc has an input symbol and an output symbol attached. By further attaching a weight to each arc, it becomes possible to represent the concept of probability. By tracing from a root node through arcs, a hypothesis is generated, and by multiplying the weights (probabilities) allocated to these arcs, it is possible to calculate the probability of occurrence of that hypothesis.

Various models are used in speech recognition. HMM, a word pronunciation dictionary and a language model can all be represented by WFST. Further, recently, a phoneme-based triphone HMM comes to be used for representing phoneme context, and it can also be represented by WFST. A word pronunciation dictionary is WFST converting a phoneme sequence to a word sequence, used for finding vocabularies. A language model is, for example, a trigram language model, realized by WFST outputting an output word sequence that is identical to the input word sequence, and it represents grammar of a language.

WFST involves an operation referred to as "composition." Composition of two WFSTs enables processing of tasks that otherwise require application of two successive WFSTs, by one composed WFST. Therefore, it is possible to compose WFSTs for the HMM, the word pronunciation dictionary, the language model and the triphone HMM to one WFST. Decoder 310 uses such a pre-trained and composed WFST. The WFST used here is a graph built in advance by language knowledge, and it employs a knowledge source referred to as HCLG. HCLG stands for a composition of four WFSTs (H, C, L, G). H stands for HMM, C context, L lexicon and G grammar. The WFST of the present embodiment further has a WFST for performing the division $(P(S_{1:T})^{-1})$ by $P(S_{1:T})$ described above, composed and incorporated therein. This WFST is a WFST converting a state sequence of HMM to a state sequence of HMM, and $P(S_t|S_{(t-N+1):(t-1)})^{-1}$ approximating $P(S_{1:T})^{-1}$ is attached to each arc. Therefore, here, this WFST is designated as "$S^{-1}HCLG$."

The number of nodes of the input layer of RNN forming acoustic model 308 is the same as the number of elements of the feature vector. The number of nodes of the output layer of RNN is the same as the number of phonemes assumed for the language handled by speech recognition device 280. Specifically, each node represents a state of acoustic model by HMM. At each node of the output layer, probability of a speech input at a time point being the phoneme represented by that node is output. Therefore, an output from acoustic model 308 is a vector having, as elements, the probabilities of input speech at that time point being the phonemes represented by respective nodes.

Decoder 310 based on $S^{-1}HCLG$ calculates probabilities of phoneme sequences by WFST 320 of $S^{-1}HCLG$ described above for each element of the vector output from acoustic model 308, and traces the WFST graph while appropriately performing pruning, whereby a recognition score including hypothesis and probability calculation is computed. Hypothesis selecting unit 322 finally outputs a word sequence having the highest recognition score (high probability of occurrence) as text 284 of speech recognition. Here, WFST 320 calculates the recognition score, directly using output from the RNN. Different from the conventional DNN-HMM framework, it is unnecessary to convert RNN outputs to make them consistent with the output format of HMM and, hence, recognition efficiency can be improved.

Experiment 1

In order to verify the effects of the direct decoding method using a RNN in accordance with the embodiment above, word error rates have been examined of the conventional method using a DNN, the conventional method using a RNN and the direct decoding method using a RNN in accordance with the embodiment above, using the same training data, and the same test data. Table 1 shows the results.

TABLE 1

| Architectures | Numbers of Hidden Layers | Numbers of Parameters | Word Error Rates | |
|---|---|---|---|---|
| | | | Conventional Methods | The Present Embodiment |
| DNN | 5 | 6M | 20.4 | — |
| DNN | 5 | 13M | 18.7 | — |
| DNN | 5 | 35M | 17.8 | — |
| RNN | 3 | 6M | 18.8 | 18.2 |
| RNN | 5 | 7M | 18 | 17.5 |
| RNN | 5 | 35M | 17.5 | 17.1 |

As can be seen from Table 1, using the direct decoding method in accordance with the embodiment above, performance comparable to or higher than the conventional method using 35M parameters could be attained by a RNN having as few as 7M parameters. Further, it can be seen that, at least in the scope of the experiment, it is possible to improve recognition performance by increasing the number of parameters, when the direct decoding method using a RNN is used.

Effects of the Embodiment

The embodiment above is directed to a speech recognition device in accordance with the direct decoding method using a RNN, in place of the DNN-HMM hybrid method. From the results of the experiment, it has been found that the speech recognition by the direct decoding method exhibits comparable or higher performance with smaller architecture than the DNN-HMM hybrid method.

[Computer Implementation]

Figure 8:
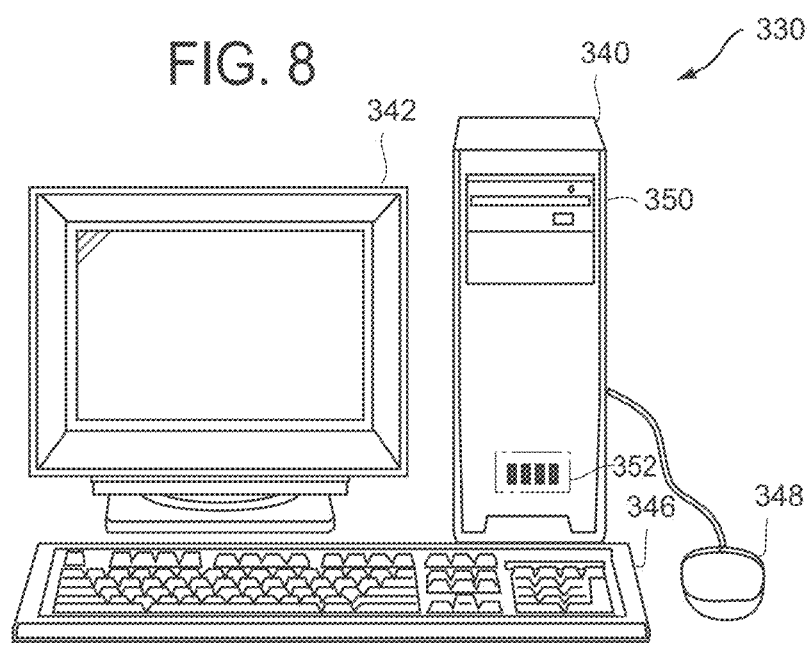
FIG. 8 shows an appearance of a computer implementing the speech recognition device in accordance with the first embodiment of the present invention.

Speech recognition device 280 in accordance with the embodiments of the present invention can be implemented by computer hardware and the computer program running on the computer hardware. FIG. 8 shows an appearance of computer system 330 and FIG. 9 shows an internal configuration of computer system 330.

Referring to FIG. 8, computer system 330 includes a computer 340 having a memory port 352 and a DVD (Digital Versatile Disc) drive 350, a keyboard 346, a mouse 348 and a monitor 342.

Figure 9:
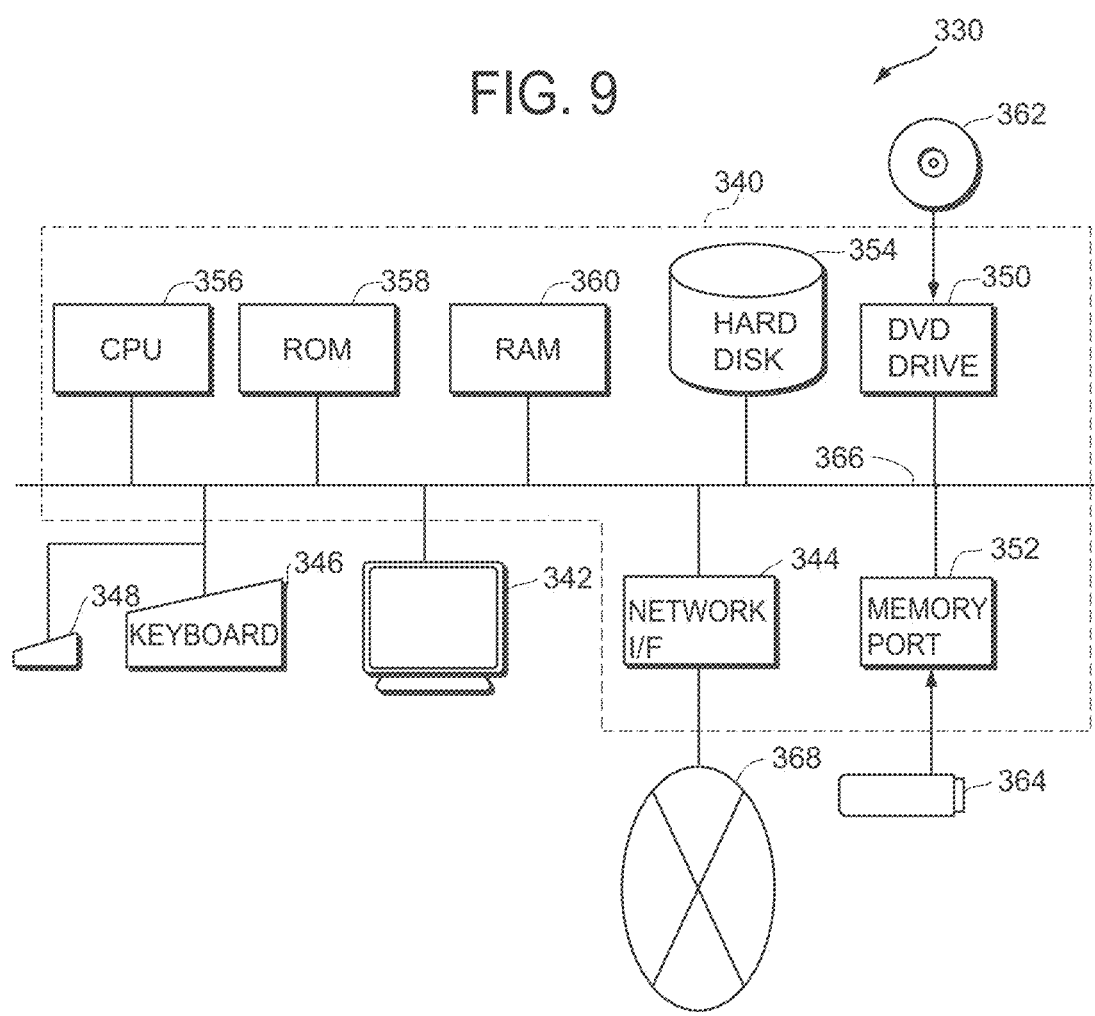
FIG. 9 is a block diagram showing hardware configuration of the computer shown in FIG. 8.

Referring to FIG. 9, in addition to memory port 352 and DVD drive 350, computer 340 includes a CPU (Central Processing Unit) 356, a bus 366 connected to CPU 356, memory port 352 and DVD drive 350, a read only memory (ROM) 358 for storing a boot program and the like, a random access memory (RAM) 360 connected to bus 366 and storing program instructions, a system program and work data, and a hard disk 354. Computer system 330 further includes a network interface (I/F) 344 providing a connection to a network 368, enabling communication with other terminals.

The computer program causing computer system 330 to function as various functional units of speech recognition device 280 in accordance with the above-described embodiments is stored in a DVD 362 or removable memory 364 loaded to DVD drive 350 or memory port 352, and transferred to hard disk 354. Alternatively, the program may be transmitted to computer 340 through network 368 and stored in hard disk 354. The program is loaded to RAM 360 at the time of execution. The program may be directly loaded to RAM 360 from DVD 362, removable memory 364, or through network 368.

The program includes a sequence of instructions consisting of a plurality of instructions causing computer 340 to function as various functional units of speech recognition device 280 in accordance with the embodiments above. Some of the basic functions necessary to cause computer 340 to operate in this manner may be provided by the operating system running on computer 340, by a third-party program, or dynamically-linkable various programming tool kits or program library installed in computer 340. Therefore, the program itself may not include all functions to realize the system, device and method of the present embodiment. The program may include only the instructions that dynamically call appropriate functions or appropriate program in the programming tool kits or in the program library in a controlled manner to attain a desired result and thereby to realize the functions of the system, device or method described above. Naturally the program itself may provide all necessary functions.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to building and operating artificial intelligence using a RNN. Specifically, it is applicable to industries manufacturing devices that provide complicated functions with high accuracy such as speech recognition, as well as to industries providing services using such functions.

REFERENCE SIGNS LIST 30 word sequence
32 phoneme sequence
34 state sequence
36 observed sequence
70 DNN
72 input layer
74, 76 hidden layer
78 output layer
100 RNN
280 speech recognition device
282 input speech
284 text of speech recognition
300 A/D converter circuit
302 framing unit
304 feature extracting unit
306 feature storage unit
308 acoustic model
310 decoder
320 WFST based on $S^{-1}HCLG$
330 computer system
340 computer
354 hard disk
356 CPU
358 ROM
360 RAM

The invention claimed is:

1. A speech recognition device including a processor configured to perform speech recognition by:
obtaining an observed sequence $X_{1:t}$, wherein the observed sequence $X_{1:t}$ consists of prescribed speech features from a speech signal from a start to a time point t;
accessing a plurality of possible state sequences;
for each state sequence $S_{1:t}$ of the plurality of possible state sequences, calculating a posterior probability $P(S_{1:t}|X_{1:t})$ of the state sequence $S_{1:t}$ matching the observed sequence $X_{1:t}$;
accessing a plurality of possible word sequences;
for each word sequence of the plurality of possible word sequences, calculating posterior probabilities of the word sequence matching each of the plurality of state sequences;
for each of the plurality of possible word sequences, calculating a score of the word sequence based on:
the posterior probabilities calculated for the word sequence matching each of the plurality of state sequences; and
the posterior probabilities calculated for each of the plurality of possible state sequences; and
outputting a particular word sequence of the plurality of possible word sequences as recognized speech based on the calculated score, wherein:
the processor calculates the posterior probabilities using a neural network responsive to an input of the observed sequence $X_{1:t}$, pre-configured to calculate posterior probabilities $P(S_t|X_{1:t})$ of a state $S_t$ that generates the observed sequence $X_{1:t}$, and
the processor is further configured to calculate a probability of occurrence of the state sequence $S_t$ based on the posterior probabilities $P(S_t|X_{1:t})$ calculated using the neural network.

2. The speech recognition device according to claim 1, wherein the processor is further configured to:
calculate posterior probability for each of the plurality of possible word sequences based on:
a probability of occurrence of a word sequence by a language model,
a state transition probability of Hidden Markov Model forming the acoustic model, and
a probability of occurrence of the state sequence calculated by the processor.

3. The speech recognition device according to claim 1, wherein each state sequence is a state of Hidden Markov Model forming the acoustic model.

4. The speech recognition device according to claim 1, wherein the neural network is a recurrent neural network.

5. A non-transitory, computer readable medium having stored thereon a computer program causing a processor of a computer to perform speech recognition as recited in claim 1.

\* \* \* \* \*